April 10, 1928.  1,665,604

P. E. NORRIS ET AL

STORAGE BATTERY SEPARATOR

Filed Oct. 1, 1924

INVENTORS:
P. E. Norris, and
H. H. Aldrich,
BY
ATTORNEY

Patented Apr. 10, 1928.                                              1,665,604

UNITED STATES PATENT OFFICE.

PAUL E. NORRIS AND HERBERT H. ALDRICH, OF WILKINSBURG, PENNSYLVANIA, ASSIGNORS TO WESTINGHOUSE UNION BATTERY COMPANY, OF SWISSVALE, PENNSYLVANIA, A CORPORATION OF PENNSYLVANIA.

STORAGE-BATTERY SEPARATOR.

Application filed October 1, 1924. Serial No. 740,942.

Our invention relates to storage battery separators.

We will describe several forms of separators embodying our invention, and will then point out the novel features thereof in the claim.

Figure 1:
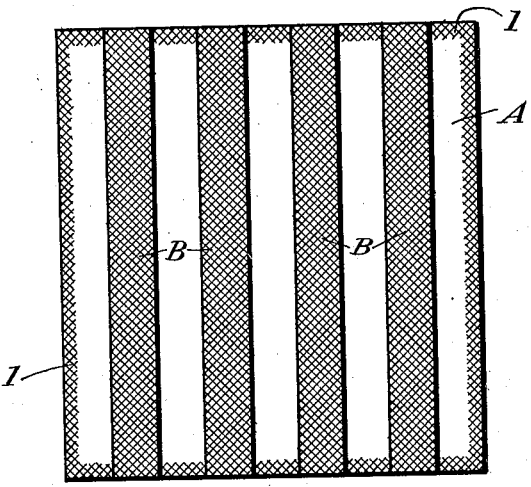
Figure 2:
Figure 3:
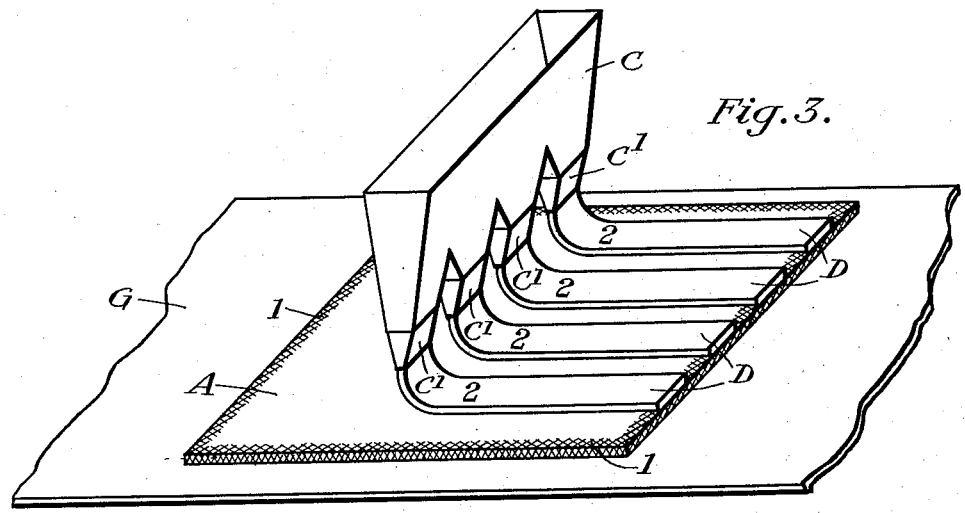
Figure 4:
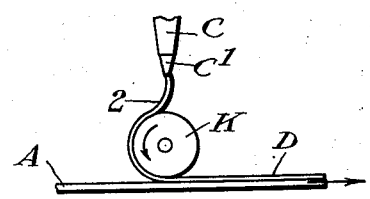

In the accompanying drawing Fig. 1 is a front view of one form of separator embodying our invention. Fig. 2 is a top plan view of the separator shown in Fig. 1. Fig. 3 is a view showing, in perspective, a modified form of separator embodying our invention, and also showing one form of apparatus embodying our invention for preparing such modified form of separator. Fig. 4 is a fragmental view showing a modification of a portion of the apparatus illustrated in Fig. 3 and also embodying our invention.

Similar reference characters refer to similar parts in each of the several views.

Referring first to Figs. 1 and 2, the separator comprises a flat sheet A, having a plurality of individual ribs B attached to this sheet in spaced relation and extending across the sheet. This separator is adapted to be interposed between adjacent battery plates and immersed in the electrolyte of a storage battery. It is desirable that the material of the separator be porous to permit the necessary transfer of electrolyte ions between plates, but the separator must be impervious to solid particles of active material. We have discovered that the material commonly known as roofing felt possesses these characteristics and is very inexpensive. Roofing felt is ordinarily made largely of the fibres of cotton rags and in the absence of any special treatment readily frays at the edges in handling. The mechanical strength of roofing felt is small and this strength is further decreased by the action of the electrolyte in the presence of air. We therefore prefer to impregnate the edges of the sheet with some electrolyte resistant strengthening material such as a bituminous compound, rubber or celluloid. This material preferably is applied to the edges 1 of the sheet A in a plastic or semi-liquid state and subsequently solidifies.

It is sometimes desirable that vertically extending spaced ribs be provided on one face of the separator. The purpose of these ribs is threefold. First, they facilitate circulation of the electrolyte; second, they permit easy escape of generated gas; and third, they increase the mechanical strength of the separator and prevent deterioration thereof by the free oxygen generated by the battery in operation.

In the form of our invention shown in Figs. 1 and 2, we provide a plurality of ribs B of roofing felt impregnated with material similar to that supplied to the edges 1 of the sheet. While the impregnating material is still plastic the ribs are pressed into position in the proper relation on the sheet A, and are held in such relation by adhesion after the impregnating material has solidified.

Referring now to Fig. 3, the separator here shown comprises a sheet A of roofing felt or paper made from tire carcasses and having impregnated edges 1 as in Fig. 1. This sheet is provided with ribs D formed entirely of a suitable electrolyte resistant material having the same characteristics as the material used to impregnate the edges of the sheet A.

One form of apparatus for applying these ribs to the separator comprises a hopper C adapted to receive the material for the ribs in a plastic condition. This hopper C is provided with a plurality of spaced orifices C' for discharging the material contained in the hopper C. These orifices are so formed that the streams 2 of rib material discharged thereby have a rectangular cross section of the shape desired in the finished rib. Means are also provided for carrying the sheet A beneath the orifices C' so that the streams 2 are received on the sheet, and then solidify, adhering to this sheet to form spaced ribs D. As here shown, a belt G carries the sheet A in the direction indicated by the arrow and the ribs are thus delivered directly from the orifices C' to the sheet A.

In the modification illustrated in Fig. 4, the sheet A is moved past the orifice C' as in Fig. 3, but the stream 2 from the orifice is delivered to a roller K which forces the stream into more intimate contact with the sheet A. The ribs D solidify as before described to complete the separator.

Although we have herein shown or described only two forms of storage battery separators embodying our invention, and only two forms of apparatus embodying our invention for constructing separators, it is understood that various changes and modifications may be made therein within the scope of the appended claim without departing from the spirit and scope of our invention.

Having thus described our invention, what we claim is:

The method of preparing a storage battery separator which consists in impregnating the edges of a sheet of roofing felt with an electrolyte resistant material in plastic condition, immersing individual strips in plastic acid resistant material, attaching said strips to the sheet by the adhesion of said material, and causing said material to solidify.

In testimony whereof we affix our signatures.

PAUL E. NORRIS.
HERBERT H. ALDRICH.